United States Patent [19]

Barch et al.

[11] 3,999,970
[45] Dec. 28, 1976

[54] GAS SUPPORT GATHERING SHOE FOR FORMING GLASS FIBERS AND METHOD FOR USING SAME

[75] Inventors: Herbert W. Barch, Natrona Heights; August G. Bohy, Lower Burrell, both of Pa.

[73] Assignee: PPG Industries, Inc., Pittsburgh, Pa.

[22] Filed: Nov. 14, 1975

[21] Appl. No.: 632,033

[52] U.S. Cl. .................................. 65/2; 28/54; 65/3 R; 65/11 W; 65/374 R; 242/157 R
[51] Int. Cl.² .................................. C03B 37/02
[58] Field of Search ............. 65/1, 2, 11 W, 374 R, 65/25 R, 374 RM, 3 R; 28/54; 242/157 R, 18 G

[56] References Cited
UNITED STATES PATENTS

| | | | |
|---|---|---|---|
| 3,080,135 | 3/1963 | Steijn | 242/157 R |
| 3,285,721 | 11/1966 | Ewing | 65/11 W X |
| 3,489,543 | 1/1970 | Kita et al. | 65/25 R |
| 3,560,178 | 2/1971 | Minkler | 65/2 X |
| 3,887,970 | 6/1975 | Drummond | 65/9 X |

*Primary Examiner*—Robert L. Lindsay, Jr.
*Attorney, Agent, or Firm*—Alan T. McDonald

[57] ABSTRACT

A gathering shoe is disclosed for combining glass filaments which have been attenuated from a bushing into a consolidated strand. The gathering shoe is formed of a porous material, preferably porous graphite, and has a central chamber or cavity within which is located gaseous fluid jets connected to a gaseous fluid supply. As gaseous fluid is forced through a slot in the porous shoe over which the glass filaments are combined into a unitary strand, the glass fiber strand rides on a gaseous fluid cushion. This decreases wear of the shoe and breakouts of the filaments caused by such wear and aids in drying the glass filaments.

19 Claims, 3 Drawing Figures

FIG. 2

GAS SUPPORT GATHERING SHOE FOR FORMING GLASS FIBERS AND METHOD FOR USING SAME

BACKGROUND OF THE INVENTION

Glass fibers are commonly attenuated from molten glass through orifices in a bushing. The number of these orifices can range from about 200 to 1200 or even more. These individual filaments are coated with a lubricant binder and/or size and are gathered into unified strands by gathering shoes. Such shoes are conventionally formed of materials such as graphite, tetrafluoroethylene and the like as can be seen in U.S. Pat. Nos. 2,782,563, 3,560,178, or 3,718,448.

As the strands are drawn across the gathering shoe, abrasion between the fibers and the shoe results in wearing of the shoe surface. The shoes are commonly rotated slightly about once every hour due to the wear and most usually be replaced at the end of each working shift, i.e., about every 8 hours. Further, due to the unevenness of this wear, breakouts often occur due to the glass fibers catching on the grooves formed on the shoe. This interrupts the formation of the glass filaments and adversely affects production.

By means of the present invention, wear of the gathering shoe can be reduced, thus lengthening the life of the shoe and improving production from the shoe. Further, due to the construction of the gathering shoe of the present invention, the glass fiber strands are subjected to a gaseous fluid stream which aids in drying the strands.

THE PRESENT INVENTION

Briefly, the present invention comprises a gathering shoe which is formed of a material such as porous graphite, or a material such as stainless steel which has holes drilled in the area in which the glass fiber strand is gathered. Central within the gathering shoe is a hollow cavity having located therein fluid jets connected to a gaseous fluid supply source. The preferred gaseous fluid is air, however other gaseous fluids such as nitrogen may be employed. This fluid jet forces gas through the porous material or the holes in the material forming an air cushion on which the glass strands may ride across the gathering shoe. This decreases the abrasion between the glass fibers and the shoe thus improving the wear of the shoe. Further, since the glass strand is riding on gaseous fluid, the fluid aids in drying of the binder and/or size on the strand.

It is known from U.S. Pat. No. 3,285,721 to ride a graphite roller on a stream of air between the roller and the support. However, the graphite employed in this patent is not porous graphite and the only purpose of the air is to decrease friction between the support and the roller. Nowhere in this reference is there any mention of air passing through graphite so that glass strand can ride on an air stream as disclosed herein.

DETAILED DESCRIPTION OF THE DRAWINGS

Figure 1:
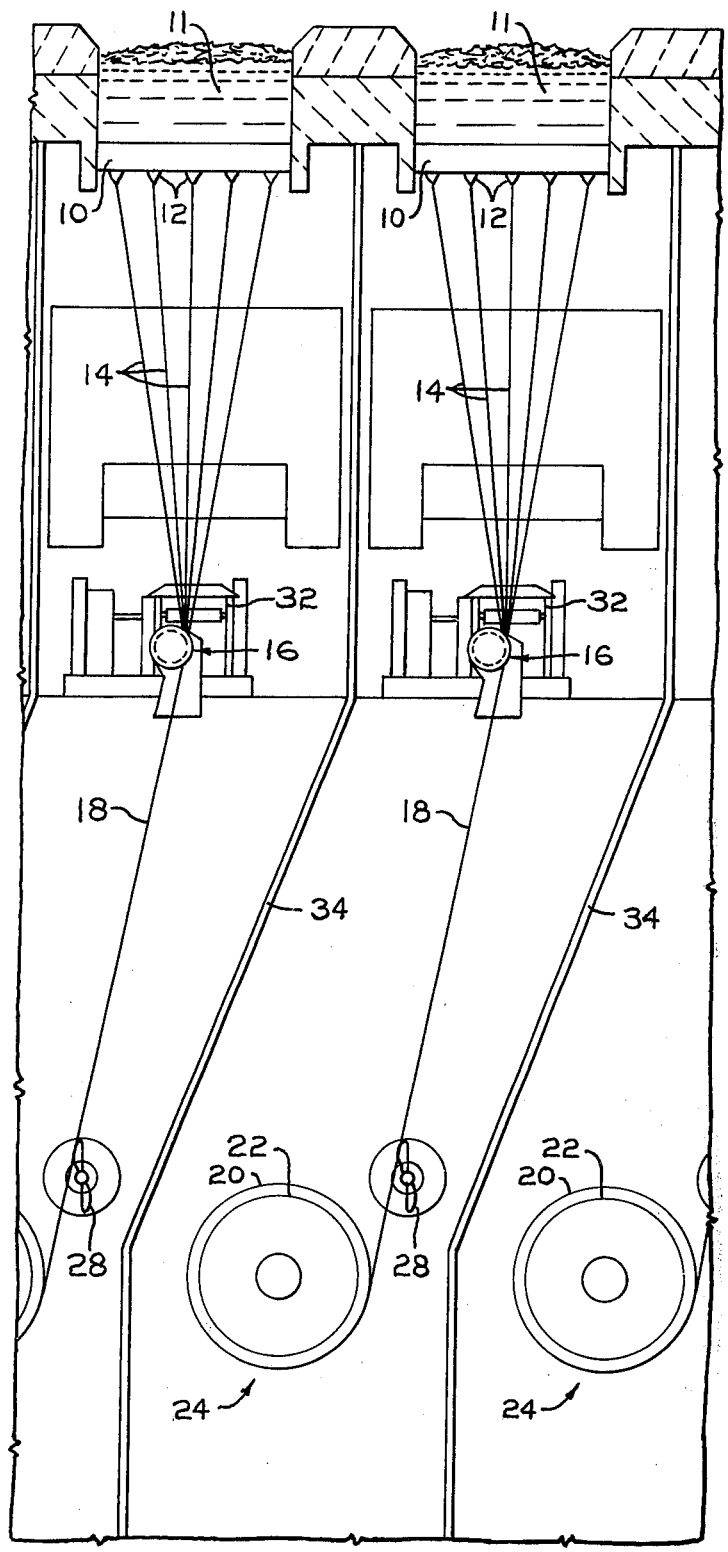
FIG. 1 is a diagrammatic illustration of a typical glass fiber strand forming operation of the present invention.

Turning now to FIG. 1 molten glass 11 is attenuated through bushing tips 12 in a bushing 10 into a number of glass filaments 14. These filaments are drawn across an applicator 32 which may be, for example, a belt applicator, a roller applicator, or the like where a coating of a lubricant binder and/or size is placed on the filaments. The filaments are then gathered by a gathering shoe mechanism generally illustrated in FIG. 1 as 16 into a unitary glass fiber strand 18. The glass strands may be drawn at speeds of from about 2500 to 18000 feet per minute or more (762 to 5486.4 meters per minute or more). The strand passes across spindle 28 and is wound on a winder mechanism 24 into a forming package 20 on mandrel 22.

Figure 2:
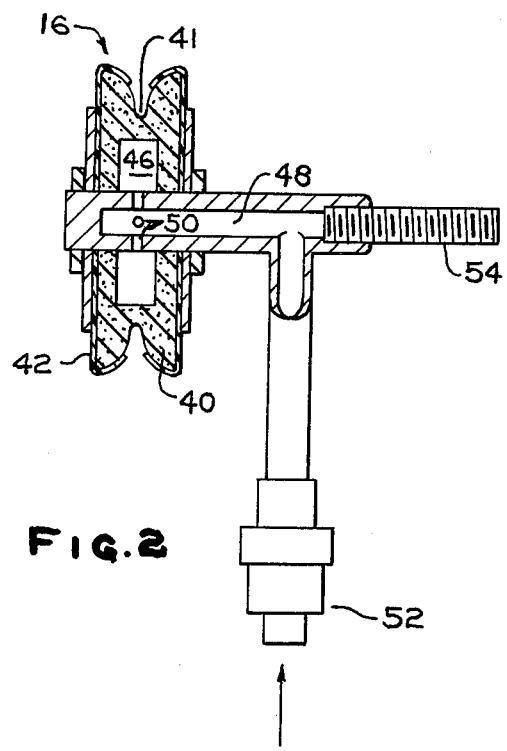
FIG. 2 is a side view partially in section of the gathering shoe mechanism of the instant invention.

The gathering shoe mechanism 16 of the present invention is illustrated in FIG. 2. The mechanism 16 comprises a shoe 40 which can be formed of such material as porous graphite or the like. This shoe preferably has a coating 42 thereon other than in the flot 41 in which the glass fiber strand rides. This coating renders the surface of the shoe 40 non-porous in those areas other than the slot 41 thus directing all air through the slot. The coating can be formed of numerous resins such as polycarbonate, polyester, etc. The preferred coating material is epoxy resin. Centrally located within the shoe is chamber or cavity 46 with air jet 48 having nozzles 50 located within. The nozzles 50 supply air under pressure to the chamber 46. The air pressure may range from about 20 to about 80 psig (240,000 to 650,000 pascals). This air is forced through the porous graphite, and, due to the resin coating of the bulk of the shoe 40, finds its way out of the porous graphite at the slot 41. An air connection 52 is used to seal the air line 48 and a mounting stud 54 is employed to connect the gathering shoe in its location along the fiber forming mechanism. As the glass filaments are drawn across the shoe 40 they are combined into a unitary strand within the slot 41. Due to the air pressure within the slot 44 the glass fibers ride over the air thus reducing the friction between the filaments 18 and the shoe 40. While the air supplied does reduce friction the glass filaments do still touch the grapite surfaces, but due to the air impinging on them erosion of the graphite is lessened by reduction of friction. In addition, the air at least partially drives the binder and/or size on the glass strand. This leads to a longer wear life of the shoe 40 and fewer breakouts of the glass strand 18 due to fewer catches of the strand in grooves formed by wear of the shoe 40.

Figure 3:
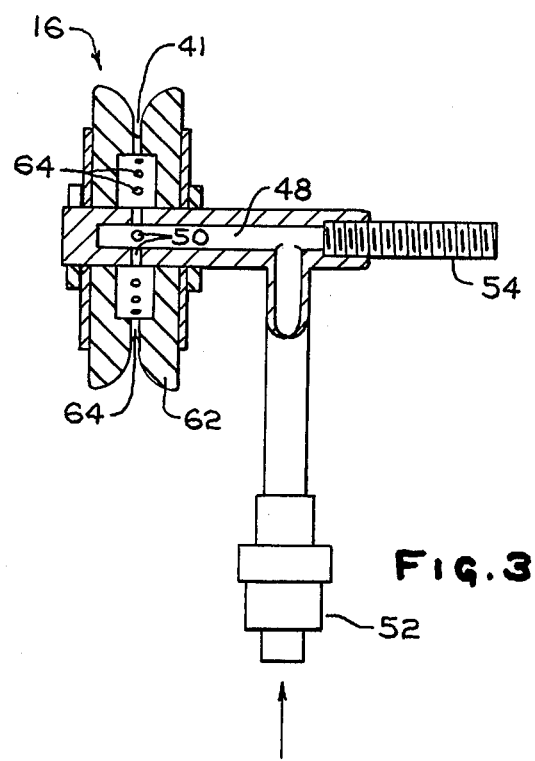
FIG. 3 is a side cross sectional view of an alternative embodiment of the gathering shoe of the instant invention.

While in the preferred embodiment the shoe of the present invention is formed of such material as porous graphite, it is within the scope of the invention to employ other porous materials or to form the shoe of such materials as stainless steel or the like as can be seen in FIG. 3, drilling holes 64 in the shoe 62 from the slots 41 to the air chamber. Such a shoe would operate in the same manner as a porous shoe.

EXAMPLE

Two G37 bushings were set up for comparison. The first employed a standard graphite gathering shoe of the prior art. The second employed a porous graphite shoe of the present invention. A stainless steel shoe was also attempted. However, due to the shape of the slot formed in this shoe, the glass strand would not stay in the slot and this shoe could not be compared. Both bushings were operated to draw glass strands across the gathering shoes at a rate of 12,420 feet per minute (3.785.6 meters per minute). The porous graphite shoe was supplied air at a pressure of 55 psig (480,000 pascals). The two shoes were run for 8 hours. During the 8 hour trial very little wear could be noted in the porous graphite shoe. The standard shoe was changed during the trial as part of a regular shoe change during the shift, it is not clear whether the change was necessary.

Samples from both shoes were evaluated. The comparisons are shown in Table I.

TABLE I

|  | Standard Shoe | | Air Shoe at 55 psig | |
| --- | --- | --- | --- | --- |
| Doff | 1st | 2nd | 1st | 2nd |
| Quilling | 19 | 30.5 | 14 | 22 |
| Strand Integrity | C | B | C | C |
| Fuzziness, % A Grade | | | | |
| Outside | 8.3 | 45.5 | 66.7 | 66.7 |
| Inside | 50.0 | 45.5 | 75.0 | 33.3 |
| Doff | 1st | 2nd | 1st | 2nd |
| Lint - Tension | C | B/C | B | B |
| Guide Eye | B | A | B | A |
| Comb | C | C | B | C |
| Binder - Tension | B | B | B | B |
| Guide Eye | B | B | B | B |
| Comb | B | A | B | A |
| Fuzzballs/MEY | 9.8 | 2.7 | 0 | 2.5 |

As can be seen from Table I, the quality of the glass strands produced with the porous graphite shoe compares favorably with the strands prepared using the standard shoe. The fuzziness was somewhat higher and the quilling grade somewhat lower for the strand produced from the porous shoe, however the fuzzballs/MEY was lower. Very little wear was noted in the porous shoe, thus the shoe could have exceeded the normal life expectancy of a standard shoe.

While the invention has been disclosed with reference to certain specific embodiments, the various details set forth in the above description of the invention are not to be considered as limitations upon the scope of the invention except insofar as set forth in the accompanying claims.

We claim:

1. In the method of forming a glass fiber strand comprising attenuating glass filaments from molten glass in a bushing, applying a binder and/or size to the attenuated filaments, gathering the filaments into a unitary strand on a gathering shoe, and winding the glass strand, the improvement comprising passing a gaseous fluid under pressure through the surface of said gathering shoe and against said strand to thereby reduce abrasion between the strand and the surface of said gathering shoe and at least partially drying said strand by contact of said strand with said gaseous fluid while said strand is passing over the surface of said gathering shoe.

2. The method of claim 2 wherein said gaseous fluid is air.

3. The method of claim 1 wherein said gathering shoe is formed of porous graphite.

4. The method of claim 3 wherein said gathering shoe is coated with a resin other than in a slot in which said glass strand rides.

5. The method of claim 4 wherein said resin is an epoxy resin.

6. The method of claim 1 wherein said glass strands are attenuated at speeds of from about 2500 to about 18000 feet per minute (762 to 5486.4 meters per minute) and said gaseous fluid is supplied to said gathering shoe at pressures of from about 20 to about 80 psig (240,000 to 650,000 pascals).

7. The method of claim 6 wherein said glass strand is attenuated at a speed of 12,420 feet per minute (3785.6 meters per minute) and said gaseous fluid is supplied at 55 psig (480,000 pascals).

8. The method of claim 1 wherein said gathering shoe is formed of stainless steel having a gaseous fluid cavity therein and having holes drilled from a slot on which said glass strands ride to said gaseous fluid cavity.

9. A gathering shoe apparatus for gathering a plurality of glass filaments into a unitary strand comprising a shoe having porous surface having a slot for receiving a glass strand, a gaseous fluid chamber within said shoe and in fluid transfer relation with said slot, and means to supply gaseous fluid under pressure to said gaseous fluid chamber and said slot.

10. The gathering shoe apparatus of claim 9 wherein said porous shoe is formed of porous graphite.

11. The gathering shoe apparatus of claim 10 wherein said porous shoe is coated with a resin other than in said slot.

12. The gathering shoe apparatus of claim 11 wherein said resin is an epoxy resin.

13. The gathering shoe of claim 9 wherein said porous shoe is formed of stainless steel and has holes connecting said slot and said gaseous fluid chamber.

14. In an apparatus for forming a glass strand from molten glass comprising a bushing, an applicator, a gathering shoe mechanism, and a winder mechanism, the improvement wherein said gathering shoe mechanism comprises a shoe having a porous surface having a slot for receiving said glass strand, a chamber within said shoe and connected in fluid transfer relation with said porous slot, and means for supplying gaseous fluid under pressure to said gaseous fluid chamber and said slot.

15. The apparatus of claim 14 wherein said porous shoe is formed of porous graphite.

16. The apparatus of claim 15 wherein said porous shoe is coated with a resin other than in said slot.

17. A cylindrical gathering shoe for gathering glass filaments into glass strand, said shoe being formed of a porous material, said shoe having a peripheral surface with an annular recess formed therein to provide a slot having opposed and bottom surfaces for receiving a glass strand, and a fluid chamber disposed within said shoe for introducing a gaseous fluid into the pores of said shoe, means for sealing the exposed surfaces of said porous shoe other than said opposed and bottom surfaces of the slot formed therein, and means for supplying gaseous fluid under pressure to said gaseous fluid chamber and said slot.

18. The apparatus of claim 16 wherein said resin is an epoxy resin.

19. The apparatus of claim 14 wherein said porous shoe is formed of stainless steel and has holes connecting said slot and said gaseous fluid chamber.

* * * * *

UNITED STATES PATENT AND TRADEMARK OFFICE
CERTIFICATE OF CORRECTION

PATENT NO. : 3,999,970

DATED : December 28, 1976

INVENTOR(S) : Herbert W. Barch and August G. Bohy

It is certified that error appears in the above-identified patent and that said Letters Patent are hereby corrected as shown below:

Column 1, line 19, "most" should be --must--.

Column 2, line 21, "flot" should be --slot--.

Column 3, line 5, after "cals", please insert --)--.

Column 3, Claim 2, line 61, "2" should be --1--.

Signed and Sealed this

Fifth Day of April 1977

[SEAL]

Attest:

RUTH C. MASON
*Attesting Officer*

C. MARSHALL DANN
*Commissioner of Patents and Trademarks*